July 31, 1962 M. M. KAHN 3,047,026
FLEXIBLE HOSE
Filed Sept. 23, 1959
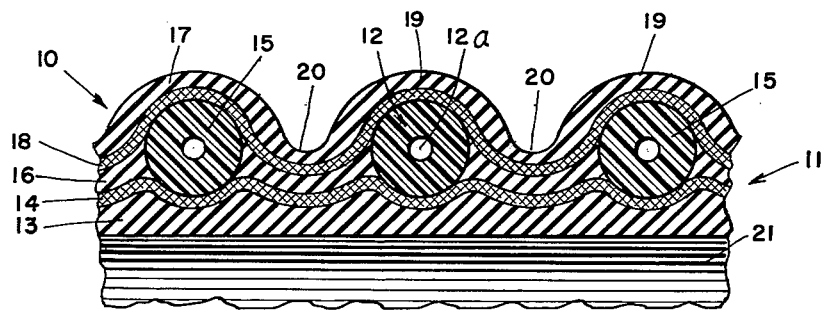
FIG. 1
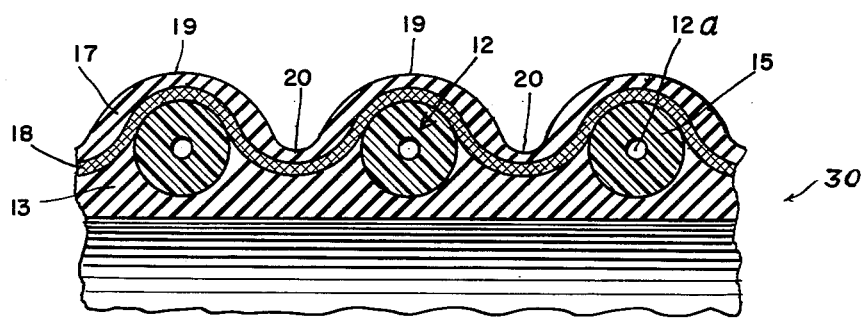
FIG. 2
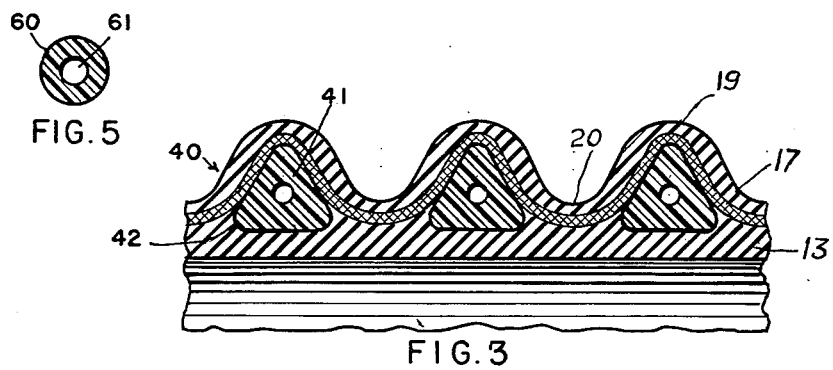
FIG. 3
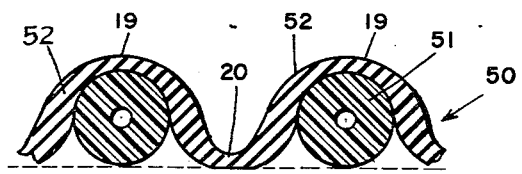
FIG. 4
FIG. 5
INVENTOR.
MARVIN M. KAHN
BY Philip G. Hilbert
ATTORNEY 3,047,026
FLEXIBLE HOSE
Marvin M. Kahn, Trenton, N.J., assignor to The Acme-Hamilton Manufacturing Corp., Trenton, N.J., a corporation of Delaware
Filed Sept. 23, 1959, Ser. No. 841,723
7 Claims. (Cl. 138—122)

This invention relates to flexible hose, and more particularly, concerns hose which is highly resistant to crushing forces; which is highly flexible and has a minimum weight per unit of length.

Hose used by contractors and in industry for suction or vacuum operations, is frequently exposed during use to crushing forces or sudden impact; as when heavy trucks or other equipment pass over the hose or when heavy objects fall on the hose. Such hose, unless heavily armored at the expense of reduced flexibility, may be deformed as a consequence of the applied load. As conventional hose of this type may include steel wire reinforcing, there may be a tendency for the hose to retain its deformed condition after the removal of the applied force; thus requiring extensive rehabilitation to restore the hose to its normal condition.

Accordingly, one object of this invention is to provide an improved flexible hose construction which includes a non-metallic, resilient helical reinforcing element; which element is operative in conjunction with the hose carcass containing the same, to offer high resistance to crushing forces or impact, and to return the hose to normal condition after temporary deformation.

Hose used to transfer liquid fuels, oils and other liquids, to and from tanker trucks and the like, must show high flexibility to facilitate handling the hose during transfer operations. Conventional hose used for such purposes has rather limited flexibility, inasmuch as such hose include a helical steel wire reinforcement embedded in the hose carcass; the wire also forming a part of the corrugated structure of the hose and being of minimum thickness to minimize weight. With such small diameter wire reinforcement, the depth of the corrugations in the hose wall is reduced, with a corresponding reduction in overall flexibility.

Accordingly, a further object of this invention is to provide an improved flexible hose of the corrugated wall type, which includes a synthetic plastic helical reinforcement of large cross section as an element of the carcass and operative to produce deep corrugations and corresponding high flexibility; said plastic being of low density, thereby minimizing the weight of the hose.

Yet another object of this invention is to provide an improved hose of the character described and including a helical reinforcing element derived from a synthetic plastic polymer; the reinforcing element being associated with a vulcanizable or thermoresponsive carcass, wherein the toughness of the reinforcing element is enhanced as a consequence of the vulcanization or heat treatment of the carcass.

Still another object of this invention is to provide an improved flexible hose of the corrugated type, wherein an extruded member of polypropylene or the like, in helical form, provides a reinforcement for an elastomeric carcass; the reinforcing member having substantial cross section to provide deep corrugations and high flexibility, yet being of low density so as to minimize the weight of a unit length of the hose; and further, being operative to impart toughness and resiliency to the hose which makes the same resistant to crushing and self restorative after temporary deformation.

Other objects of this invention will in part be obvious and in part hereinafter pointed out.

In the drawing, FIG. 1 is a longitudinal section through a portion of a flexible hose embodying the invention;

FIG. 2 is a view similar to that of FIG. 1, showing a modified embodiment of the invention;

FIG. 3 is also a view similar to that of FIG. 1, showing still another form of the invention;

FIG. 4 is a longitudinal section of a hose, showing yet a further modification of the invention; and FIG. 5 is a transverse section of a modified form of plastic reinforcement for hose embodying the invention.

It has been found that flexible hose of the corrugated type having a helical reinforcement associated therewith, shows a number of improved and desirable properties, when the reinforcement is derived from synthetic resins which are tough, highly resilient and free from embrittlement. Thus, with a reinforcing element formed from polypropylene and the like, the cross section of the element may be substantial to increase the depth of corrugation and resultant flexibility, yet minimizing the hose weight due to the low density of the resin.

Furthermore, it has been found that with resins such as polypropylene, the marked toughness thereof is devoid of embrittlement and forms an excellent complement for its high flexibility, so as to make the same particularly effective as a reinforcing element for flexible, corrugated type hose.

Thus, as shown in FIG. 1, 10 designates a hose embodying the invention. The same comprises essentially a carcass generally indicated at 11 and a helical reinforcing member 12 associated therewith. Carcass 11 may be formed of an elastomeric material such as natural or synthetic rubber, as well as elastomeric organic plastics such as polyamides, polyethylene, vinyl copolymers, vinyl acetate, polyvinyl chloride, vinylidene chloride and the like. The synthetic rubbers may include butadiene-styrene or butadiene-acrylonitrile copolymers; polychloroprene, polysulfides, polybutenes and the like.

Carcass 11 comprises an inner portion 13 which has embedded therein a woven or braided fabric reinforcement indicated at 14. Carcass portion 13 may include other fibrous or filamentary reinforcements distributed longitudinally or circumferentially thereof.

Reinforcing member 12 may be formed by extruding polypropylene resin or the like, as a rod of circular cross section, which may be formed with an axial bore 12a of relatively small diameter, as an incident of the extrusion process. The extruded rod may be preformed as a helix with longitudinally spaced convolutions 15.

The reinforcing helix 12 is disposed over inner carcass portion 13. A strip 16 of elastomeric material similar to that of carcass portion 13, is wound helically over carcass portion 13 between helix convolutions 15; the edges of said strip abutting the side portions of said helix convolutions.

Carcass 11 further includes an outer portion 17, also of elastomeric material and having embedded therein a woven or braided fiber reinforcement 18. Carcass portion 17 may be somewhat thinner than carcass portion 13 and closely conforms to the top and sides of helix convolutions 15, thereby forming successive peaks 19 and valleys 20 to constitute a corrugated outer wall for hose 10.

Preferably, the inner carcass portion 13, helix 12, strip 16 and outer carcass portion 17 are successively assembled on a smooth circular mandrel, not shown. A cord, not shown, is wound helically over outer carcass portion 17 between helix convolutions 15, to pull down said carcass portion and thereby form the peaks 19 and valleys 20. The mandrel and carcass 11 assembled thereon is then placed in a heated oven held at a temperature to vulcanize or cure the elastomeric carcass portions and bond the same together in a unitary structure embedding helix 12.

After removal from the oven, the corrugating cord is removed and the finished hose 10 is separated from its forming mandrel; the hose showing a smooth inner surface 21 originally in contact with the mandrel. The depth of the corrugations in the hose may be varied with suitable selection of helix 12 in accordance with its cross sectional diameter. Extruded rod having a diameter of from about 1/8" to about 3/8" has been found to be effective in forming hose having flexibility and crush resistance of high order.

Since the specific gravity of polypropylene is about 0.90, while that of steel is about 7.8, it will be apparent that despite the large cross section of the plastic reinforcing member 12, the resultant increase in hose flexibility will be accompanied by a relatively low weight per unit length, as compared to conventional hose having a steel reinforcing member.

In FIG. 2 is shown a hose 30 which is similar to hose 10 of FIG. 1, except that the fabric reinforcement 14 is omitted and inner carcass portion 13 is directly bonded to the outer carcass portion 17 between convolutions 15 of reinforcing helix 12.

The hose 40 shown in FIG. 3 is similar to hose 30 of FIG. 2, except that reinforcing member 41 is extruded in substantially triangular cross section. With this form of reinforcing member, the pulled down portions of outer carcass portion 17 lie smoothly along the sides of member 41 to form the peaks 19 and valleys 20. The corners of member 41 may be slightly rounded as at 42. It is understood that the plastic reinforcing member may have still other cross sectional configurations including square, rectangular and the like, with appropriate modification of the form of peaks 19 and valleys 20.

In FIG. 4 is shown a hose 50 having maximum flexibility, yet showing excellent resistance to crushing. Hose 50 comprises a helical reinforcing element 51 of polypropylene or the like, with an outer covering 52 of elastomeric material which has helically disposed portions thereof pulled down between convolutions of the reinforcing element 51, to provide deep corrugations. The covering 52 may take the form of a seamless sheath of the selected elastomeric material which is drawn over the helix 51 carried on a mandrel, not shown, all in a manner known in the art. When the hose 50 is oven treated to vulcanize or set covering 52, the convolutions of helix 51 are retained in the formed corrugations of said covering 52.

In tank wagon hose or other forms of hose used in transferring gasoline, fuel oil or other hydrocarbons, as well as various chemicals, the interiorly exposed carcass portion is formed from synthetic rubber or other organic elastomers which are insoluble in the liquid being transferred. Wire conductors, not shown, may be disposed in the small axial bore 12a of the reinforcing polypropylene helix, to provide electrical grounding means or as a current conductor for the hose.

If desired, the helical reinforcing elements may be provided with enlarged axial bores, as shown in FIG. 5, where the plastic reinforcing element 60 is extruded with a bore 61. In this case element 60 provides means for carrying liquids or gases in a helical path through the wall of the hose. However, such a hose construction will retain a major portion of the flexibility and resistance to crushing shown by the hose having small bore helical reinforcing members.

It has been found that the initial toughness of the polypropylene reinforcing elements is not affected, and in fact enhanced, by the heat treatment necessary to vulcanize or cure the hose carcass. Furthermore, the plastic is free of embrittlement and its resiliency is retained despite the heat treatment of the hose containing the same.

Although the convolutions of the plastic reinforcing helix are totally or partially encased by carcass portions of the hose, the helix is in non-bonded relation to said carcass portions, particularly when the carcass is formed of natural or synthetic rubber. Such non-bonded or "floating" relation of the reinforcing helix to its carcass keeps flexibility of the hose at a high order.

Hose made in accordance with the instant invention may be made in widely varying internal diameters, and is particularly useful in hose of rather large internal diameters. Thus, hose having an internal diameter of 3" made with a natural rubber carcass and a polypropylene reinforcement having a cross section of 3/8", proved highly efficient in use and was not adversely affected by the passage thereover of 10 ton trucks, bulldozers and the like. In all cases, the hose was self restoring after the temporary deformation thereof.

As various changes might be made in the embodiments of the invention described herein without departing from the spirit thereof, it is understood that all matter shown or described herein is illustrative and not limiting except as set forth in the appended claims.

Having thus disclosed my invention, I claim as new and desire to protect by Letters Patent:

1. A flexible, crushproof hose comprising an elastomeric carcass including helical peak and valley portions on the outer surface thereof, and a helical polypropylene reinforcing element, the successive convolutions of said reinforcing element being located within the successive, respective peak portions of said carcass.

2. A flexible hose comprising a carcass having inner and outer portions, and a helical polypropylene reinforcing element having successive, longitudinally spaced convolutions disposed between said inner and outer carcass portions, said outer carcass portion including longitudinally spaced portions enclosing portions of said reinforcing element to provide successive peak portions, said outer carcass portion further including longitudinally spaced portions between said first mentioned longitudinally spaced portions and in bonded relation to opposed portions of said inner carcass portion to provide successive valley portions between said peak portions.

3. A hose as in claim 2 wherein said reinforcing element is formed with an axial bore to provide a helical conduit within said element.

4. A hose as in claim 2 wherein fibrous reinforcing material is disposed between said outer carcass portion and said reinforcing element.

5. A hose as in claim 3 wherein fibrous reinforcing material is disposed between said inner carcass portion and said reinforcing element.

6. A hose as in claim 2 wherein said reinforcing element has a cross sectional diameter of from about 1/8" to about 3/8".

7. A hose as in claim 2 wherein said reinforcing element has a substantially triangular cross section.

References Cited in the file of this patent

UNITED STATES PATENTS

| | | |
|---|---|---|
| 489,478 | Hopkinson | Jan. 10, 1893 |
| 1,052,106 | Voorhees | Feb. 4, 1913 |
| 2,578,140 | Krupp | Dec. 11, 1951 |
| 2,882,263 | Natta | Apr. 14, 1959 |
| 2,898,942 | Rothermal | Aug. 11, 1959 |
| 2,918,394 | Smith | Dec. 22, 1959 |

FOREIGN PATENTS

| | | |
|---|---|---|
| 15,869 | Great Britain | Mar. 28, 1912 |
| 157,203 | Australia | June 24, 1954 |
| 413,399 | Great Britain | July 19, 1934 |
| 553,308 | Great Britain | May 17, 1943 |